(12) United States Patent
Kimura et al.

(10) Patent No.: US 7,885,161 B2
(45) Date of Patent: Feb. 8, 2011

(54) INFORMATION RECORDING APPARATUS, INFORMATION READING APPARATUS AND COMPUTER READABLE MEDIUM

(75) Inventors: Tetsuya Kimura, Kanagawa (JP); Kensuke Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 454 days.

(21) Appl. No.: 12/166,832

(22) Filed: Jul. 2, 2008

(65) Prior Publication Data

US 2009/0161514 A1    Jun. 25, 2009

(30) Foreign Application Priority Data

Dec. 19, 2007    (JP) .............................. 2007-328055

(51) Int. Cl.
   *G11B 5/09*    (2006.01)
(52) U.S. Cl. ................ 369/59.26; 369/59.12; 369/13.1; 369/47.1
(58) Field of Classification Search ........................ None
See application file for complete search history.

(56) References Cited

U.S. PATENT DOCUMENTS 7,187,643 B2 *   3/2007   Isshiki et al. ............. 369/275.4

2005/0058034 A1 *   3/2005   Ando et al. ............... 369/47.27
2005/0288938 A1   12/2005   Date et al.
2009/0129232 A1 *   5/2009   Ando et al. ................. 369/100

FOREIGN PATENT DOCUMENTS

| JP | A-2001-100623 | 4/2001 |
| JP | A-2002-103782 | 4/2002 |
| JP | A-2002-117165 | 4/2002 |
| JP | A-2004-094510 | 3/2004 |

* cited by examiner

*Primary Examiner*—Muhammad N Edun
(74) *Attorney, Agent, or Firm*—Oliff & Berridge, PLC

(57) ABSTRACT

An information recording apparatus includes an information obtaining unit, a sign arrangement generating unit, a sign arrangement recording unit. The information obtaining unit obtains information to be recorded on a recording medium. The sign arrangement generating unit, based on information to be obtained by the information obtaining unit, generates an arrangement having three or more kinds of signs for expressing the obtained information. The sign arrangement recording unit, while shifting recording positions of a recording area included in the recording medium, records physical features sequentially into the respective recording positions of the recording area included in the recording medium. And each physical feature corresponds to one kind of the signs.

17 Claims, 8 Drawing Sheets

INFORMATION RECORDING APPARATUS, INFORMATION READING APPARATUS AND COMPUTER READABLE MEDIUM

CROSS-REFERENCE TO RELATED APPLICATIONS

This application is based on and claims priority under 35 USC 119 from Japanese Patent Application No. 2007-328055 filed Dec. 19, 2007.

BACKGROUND

1. Technical Field

The present invention relates to an information recording apparatus, an information reading apparatus and a computer readable medium.

2. Related Art

In a conventional information recording apparatus, information to be recorded is expressed in an arrangement composed of two kinds of signs such as 0 and 1, and the respective signs contained in such arrangement are recorded sequentially in a recording medium having a magnetic recording area or a recording area capable of forming an image therein in such a manner that, while shifting the recording positions of the recording area, one of two kinds of states corresponding to one of the signs is applied to each recording position.

SUMMARY

According to an aspect of the invention, an information recording apparatus includes an information obtaining unit, a sign arrangement generating unit, a sign arrangement recording unit. The information obtaining unit obtains information to be recorded on a recording medium. The sign arrangement generating unit, based on information to be obtained by the information obtaining unit, generates an arrangement having three or more kinds of signs for expressing the obtained information. The sign arrangement recording unit, while shifting recording positions of a recording area included in the recording medium, records physical features sequentially into the respective recording positions of the recording area included in the recording medium. And each physical feature corresponds to one kind of the signs.

BRIEF DESCRIPTION OF THE DRAWINGS

Exemplary embodiment(s) of the present invention will be described in detail based on the following figures, wherein.

DETAILED DESCRIPTION

Now, description will be given below of an exemplary embodiment according to the invention with reference to the accompanying drawings. According to the present exemplary embodiment, an information recording apparatus records information, which is based on a characteristic having a random property existing on the surface of a recording medium, into a recording area, and an information reading apparatus checks the information recorded in the recording area of the recording medium with the characteristic existing on the surface of the recording medium to thereby check whether the information is the information recorded by the information recording apparatus or not.

Figure 1:
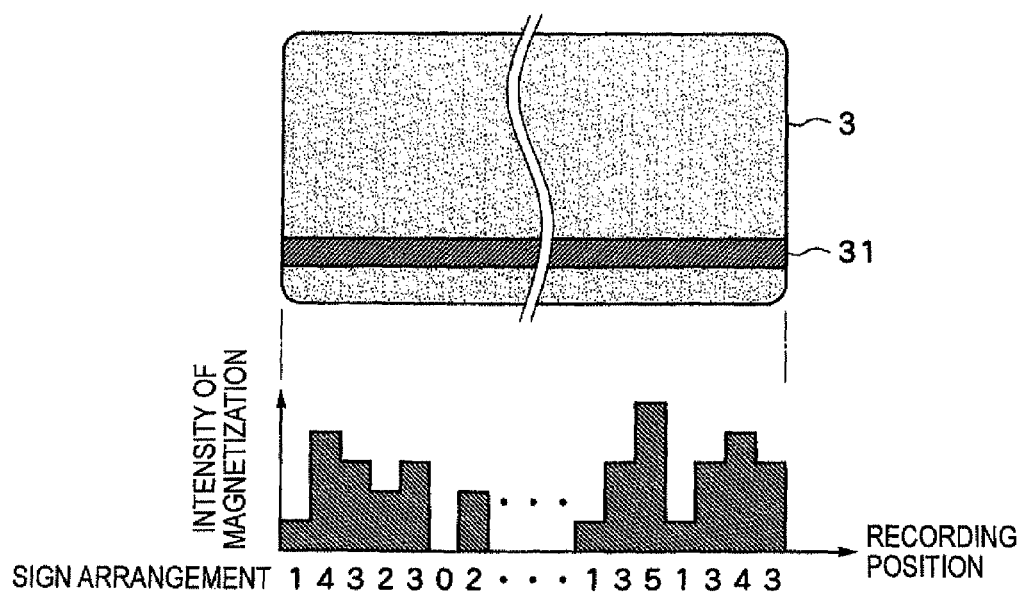
FIG. 1 is a view of an example of the recording state of magnetic recording data with respect to a recording medium.

FIG. 1 is a typical view of a magnetic recording method employed in the exemplary embodiment. According to an example of the exemplary embodiment, a recording medium 3 is formed as a card. The recording medium 3 has a recording area 31. Here, the recording area 31 is formed as a magnetic recording area. The information recording apparatus converts information to be recorded (recording target information) into sign arrangements which are respectively expressed by six kinds of signs of 0 to 5, and records the information to be recorded at the respective positions of the recording area 31 with the intensities of magnetization that correspond to the sign arrangements. Here, a graph used to show the intensities of magnetization in FIG. 1 represents the intensities of magnetization that have been respectively recorded at the corresponding positions of the recording area 31. By the way, in FIG. 1, the intensities of magnetization to be recorded include six kinds; however, in order to be able to realize the enhancement of the recording density, the number of such kinds may be three or more (the number of such kinds is hereinafter referred to as a state number). Also, each of the recording positions means an area serving as a unit by which the information recording apparatus writes information, while this recording position agrees with an area (a reading position) by which the information reading apparatus reads information.

FIG. 2 is a view of a recording medium 3 according to the exemplary embodiment, and an image 45 according to the exemplary embodiment used as an example of a characteristic having a random property existing on the surface of the recording medium 3. The information recording apparatus records information expressing a characteristic having a random property read from a first area 41, as information to be recorded, into the recording area 31 of the recording medium 3. Here, the first area 41 and second area 42 are areas which are set in the surface of the recording medium 3.

Here, description will be given of a characteristic having a random property. A characteristic having a random property is a fine and irregular characteristic pattern which appears on the surface of an article due to the factor that cannot be controlled even when the article is manufactured. Since the pattern has no regularity, in a certain area of a certain article, there appears a pattern which is different not only from the pattern of an arbitrary area of other article but also from the patterns of other areas of the very certain article. Using this characteristic, when the characteristic pattern of a certain article is previously obtained and is checked with the characteristic pattern of an article to be checked, it is possible to check whether the article to be checked is a specified article or not.

By the way, since the above-mentioned characteristic pattern is a fine pattern which cannot be controlled when the article is manufactured, it also has a characteristic which makes it difficult for a third party to reproduce the same characteristic pattern.

Figures 2A, 2B:
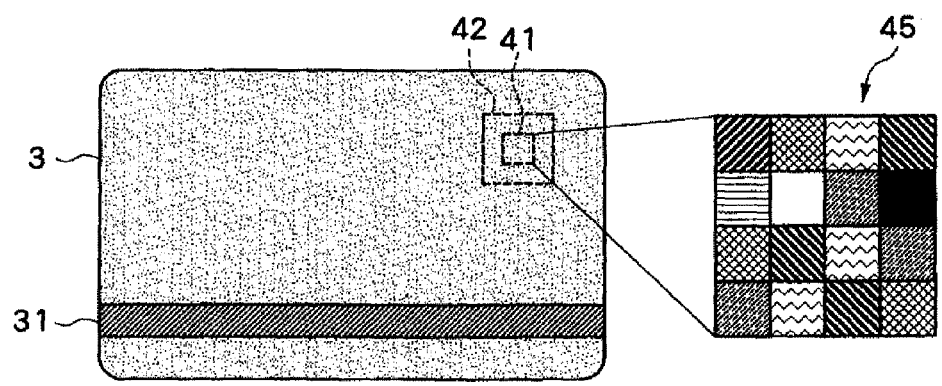
FIG. 2 is a view of an example of a recording medium and a characteristic having a random property.

Since irregular portions forming the characteristic pattern appear as, for example, variations in the reflectance of light, they can be read as differences in the lightness by an optical scanner or the like. The image 45 shown in FIG. 2B is an example of a characteristic having a random property, which is obtained when the first area 41 is read by an optical scanner or the like. Each of areas respectively surrounded by their corresponding squares of the image 45 expresses a unit area, while a difference in the pattern between the respective areas expresses a difference in the lightness caused by a variation in the light reflectance. The pattern of brightness read by an optical scanner or the like also has no regularity but has a random property.

As an example of a material in which a characteristic having the above random property appears, there is available paper. Paper is produced in such a manner that fibrous materials are twined complexly with each other, while the manner of twining of the fibrous materials cannot be controlled when the paper is manufactured. As a result of this, on the surface of the paper, there appears a characteristic which is fine and has no regularity.

Also, on the surface of the paper, there are produced irregular portions depending on the manner of twining of the fibrous materials. Therefore, the characteristic pattern can be read by an optical scanner or the like as a variation in the light transmission or light reflectance that is caused by the irregular portions. By checking the thus-read characteristic pattern with the characteristic pattern that has been previously read, it is possible to check whether an article having the thus-read characteristic pattern is a specified article or not.

As another example of the material in which a characteristic having the above random property appears, there is available a non-woven fabric. The non-woven fabric, similarly to the paper, is produced in such a manner that fibers are complexly twined with each other; and, the manner of twining of the fibers cannot be controlled when the non-woven fabric is manufactured. On the surface of the non-woven fabric as well, there appears a characteristic pattern which is fine and has no regularity.

The information reading apparatus reads the intensities of magnetization recorded in the respective positions of the recording area 31 of the recording medium shown in FIG. 1 from the recording area 31, and checks to which one of the six kinds of signs of 0 to 5 the thus-read intensities of magnetization correspond. And, the information reading apparatus converts an arrangement, which is the set of the signs, into information. The number of kinds of the signs to be checked is equal to the state number set in the information recording apparatus.

The information reading apparatus checks the information read from the recording area 31 according to the above-mentioned manner with the information that expresses a characteristic having the random property of the surface of the recording medium 3. When a recording medium is the recording medium 3 that has been recorded by the information recording apparatus, the two pieces of information checked correspond to each other. When the recording contents or the like of a certain correct recording medium 3 are reproduced in another recording medium 3, the two pieces of information checked do not correspond to each other. This makes it possible to check whether a recording medium is the recording medium that has been recorded by the information recording apparatus or not.

Figure 3:
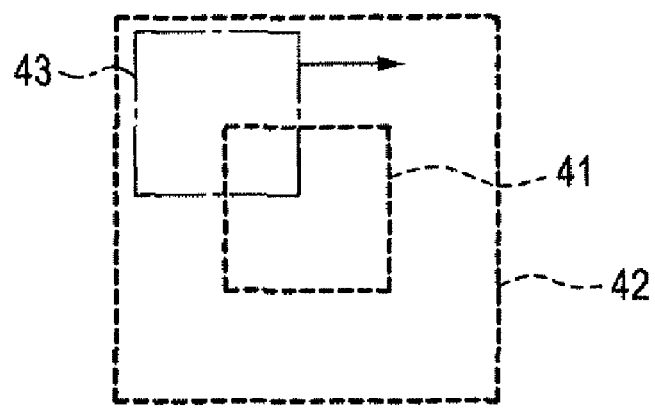
FIG. 3 is a view of a first area, a second area and a correlation computing target area.

FIG. 3 is a view of an area to be compared when the information reading apparatus carries out its checking operation. A first area 41 shown in FIG. 3 is the same area as has been described in FIG. 2. A second area 42 is an area from which the information reading apparatus reads check information, while the second area 42 is formed wider than the first area 41. An area to be correlation computed 43 (which is hereinafter referred to as a correlation computing target area 43) is an area which is set within the second area 42 and is formed equal in size to the first area 41. The reason why the second area 42 contains the first area 41 and also is wider than the first area 41 is that the peripheral portions of the first area 41 are also used as targets to be checked to thereby prevent the occurrence of a wrong determination which can be otherwise caused by a position shift, a reading error or the like.

Now, description will be given below of the outline of an example of the checking method employed by the information reading apparatus. The information reading apparatus, firstly, reads a characteristic having the random property of the second area 42 to thereby obtain check information. Next, while moving the correlation computing target area 43 within the second area 42, the information reading apparatus computes correlations between information, which expresses such portion that is cut out from the above-obtained information and corresponds to the correlation computing target area 43, and information read from the recording area 31 respectively and, according to the results of such correlation computation, carries out a checking or determining operation. Description will be given later of the details of such correlation computing method and checking method.

By the way, if the resolution of the optical reading when obtaining the check information is 600 dpi, the size of the first area 41 may be approx. 1.4 square millimeters (32×32 dots) and the size of the second area 42 may be approx. 2.7 square millimeters (64×64 dots).

[Information Recording Apparatus]

Figure 4:
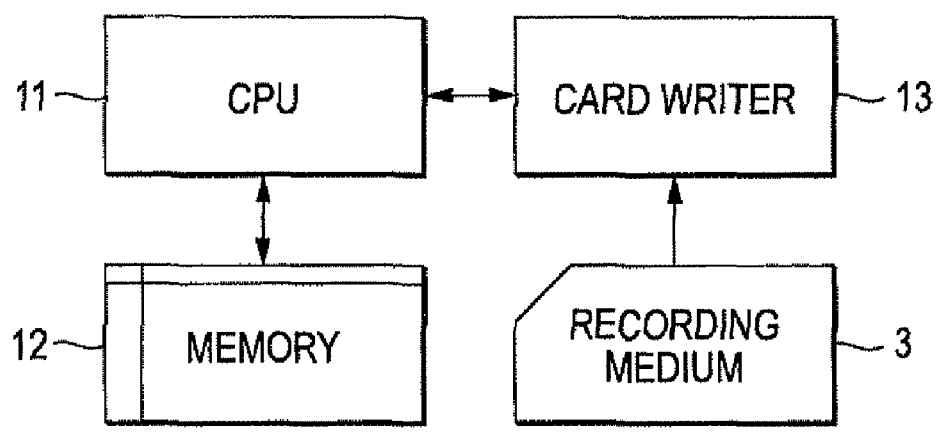
FIG. 4 is a structure block diagram of a structure example of an information recording apparatus according to an exemplary embodiment of the invention.

Next, description will be given below of the structure of an information recording apparatus according to the exemplary embodiment. FIG. 4 is an example of a structure view of an information recording apparatus. As shown in FIG. 4, the information recording apparatus includes a CPU 11, a memory 12, and a magnetic card writer 13 having an optical reading portion connected to the input/output port of the information recording apparatus.

The CPU 11 operates according to a program which is recorded on the memory 12. This program may be a program which is stored in an information storage medium such as a CD-ROM or a DVD-ROM and is supplied as the need arises, or a program which can be supplied through a network such an internet.

The memory 12 is a memory device such as a RAM or a ROM. The memory 12 can store the above-mentioned program therein. Also, the memory 12 can store therein information and computation results which are input from the respective portions of the information recording apparatus.

Figure 5:
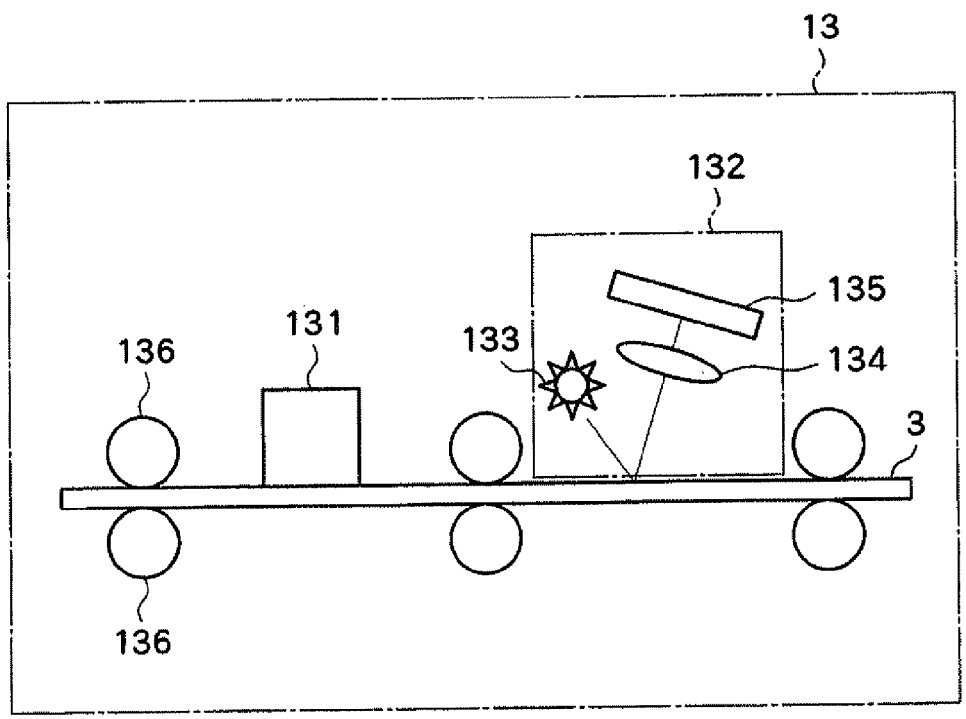
FIG. 5 is a view of a structure example of a magnetic card writer with an optical recording portion.

FIG. 5 is a view of an example of a structure of the magnetic card writer with an optical reading portion 13. The magnetic card writer with an optical reading portion 13 includes a magnetic recording portion 131, an optical reading portion 132 and two rollers 136.

The magnetic recording portion 131, under the control of the CPU 11, magnetizes the respective recording positions of the recording area 31 of the recording medium 3 with specified intensities of magnetization using a magnetic head, and records therein the respective pieces of information on the intensities of magnetization.

The optical reading portion 132 includes a lens 134, an image pickup device 135 such as a CCD having a given resolution and a light source 133 used to read an image. The optical reading portion 132 reads the pattern of the lightness of the surface of the first area 41 of the recording medium 3.

The recording medium 3 is charged into the interior of the card writer 13 from a card charge/discharge portion (not shown) by the rollers 136 and, after execution of the above-mentioned operation, is discharged to the card charge/discharge portion.

Figure 6:
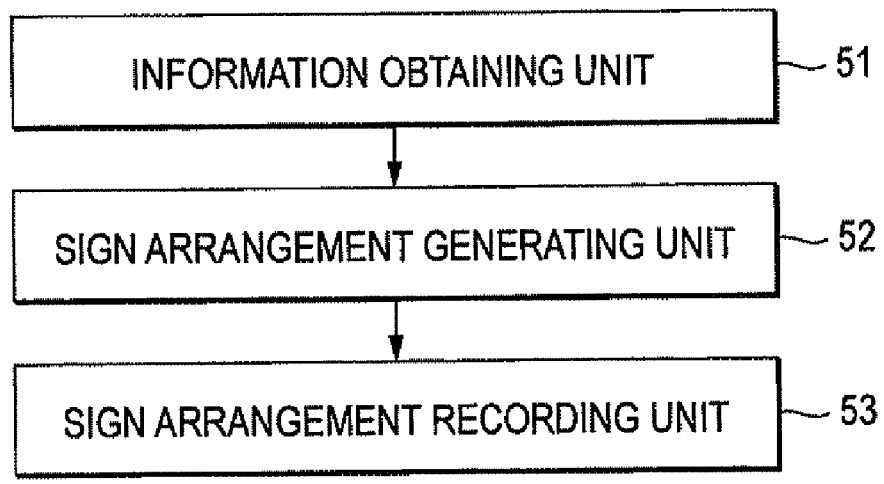
FIG. 6 is a function block diagram of the information recording apparatus according to the exemplary embodiment of the invention.

FIG. 6 is a function block diagram of functions which can be realized by the information recording apparatus. The information recording apparatus functionally includes an information obtaining unit 51, a sign arrangement generating unit 52 and a sign arrangement recording unit 53. These functions can be realized by the CPU 11 carrying out the program stored in the memory 12 to thereby control the magnetic card writer with an optical reading portion 13.

The information obtaining unit 51 can be realized mainly by the CPU 11 and magnetic card writer with an optical reading portion 13. The information obtaining unit 51, when a card used to record information therein is set in the magnetic card writer with an optical reading portion 13, reads the pattern of the lightness of the surface of the first area 41 using the optical reading portion 132 and stores the thus-read lightness pattern information into the memory 12.

Here, the optical reading portion 132 reads a variation in the light reflectance, which is caused by a characteristic having a random property existing on the surface of the first area 41 serving as an area to be read, with a given level of resolution (for example, 600 dpi) and with a given level of gradation (for example, 256 pieces of gradation).

By the way, in order to facilitate a checking processing to be executed later, the information obtaining unit 51 may also enforce a correcting processing such as a noise removing processing and a contrasting processing on the above-read information about the lightness of the surface of the first area 41, and after then may store such information into the memory.

The sign arrangement generating unit 52 can be realized mainly by the CPU 11. The sign arrangement generating unit 52 converts information, which the information obtaining unit 51 has read and stored into the memory 12, to an arrangement composed of a plurality of signs, and then stores the arrangement into the memory 12. The number of kinds of the respective signs constituting the arrangement should agree with the state number. For example, when the state number is 6, the sign arrangement generating unit 52 generates an arrangement composed of six kinds of signs such as 0, 1, 2, 3, 4 and 5.

The sign arrangement generating unit 52, for example, based on information expressing the pattern of the lightness of the surface of the first area 41, sets a number of kinds of signs corresponding to the state number according to the lightness of the respective pixels, generates an arrangement, in which the number of pixels to be read corresponds to the number of elements composed of the respective signs, (when an area to be read is 32 dots×32 dots, the number of elements is 1024), and then records the arrangement into the memory 12.

Alternatively, the sign arrangement generating unit 52 may also convert information, which is obtained by encrypting the information recorded onto the memory 12 by the information obtaining unit 51, to an arrangement of signs. Here, the above-mentioned encryption method has a characteristic which cannot be encrypted by a third party. (This encryption method is hereinafter referred to as an encryption method A.)

When the above-mentioned encrypted information is recorded into the recording area 31, a third party is not able to record meaningful information into the recording area 31, because the third party is not able to encrypt information according to the encryption method A. This can prevent such problem that a third party records information into a new recording medium 3 without using the information recording apparatus according to the exemplary embodiment and makes the information reading apparatus determine such information to be recorded by the information recording apparatus (a so called pretension). To realize the above pretension, a third party must encrypt information read from the first area 41 of a new recording medium 3 and then record such information into the recording area 31 of the new recording medium 3. However, actually, the third party is not in a position to use the encryption method A.

The sign arrangement recording unit 53 is structured mainly by the CPU 11 and the magnetic card writer with an optical reading portion 13. The sign arrangement recording unit 53, while shifting the recording positions of the recording area 31 sequentially in order of sign arrangements generated by the sign arrangement generating unit 52, magnetizes the respective recording positions with such kinds of intensities as corresponding to the signs.

The magnetization is carried out by the magnetic recording portion 131, while the movement of the recording positions on the recording area 31 can be realized by the roller 136 moving the recording medium 3.

[Information Reading Apparatus]

Figure 7:
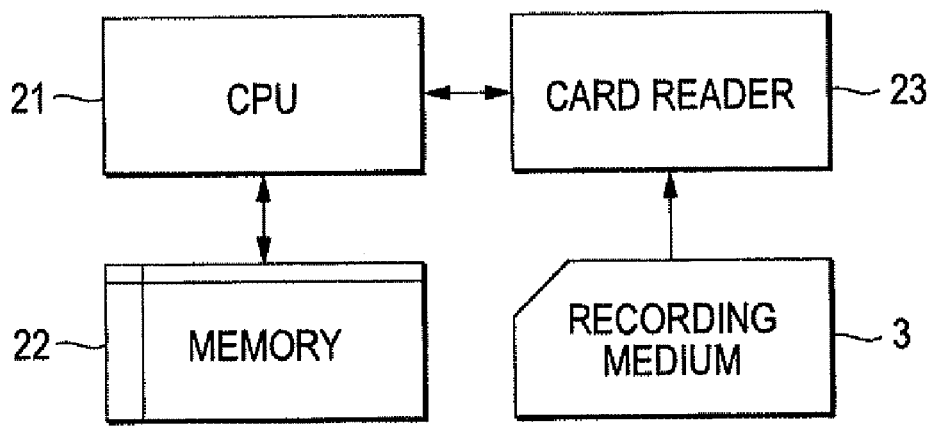
FIG. 7 is a structure block diagram of a structure example of an information reading apparatus according to an exemplary embodiment of the invention.

Next, description will be given below of the structure of the information reading apparatus according to the present exemplary embodiment. FIG. 7 is an example of a structure view of the information reading apparatus. The information reading apparatus includes a CPU 21, a memory 22, and a magnetic card reader with an optical reading portion 23 which is connected to the input/output port of the CPU 21.

The CPU 21 and memory 22 are respectively similar to the CPU 11 and memory 12 used in the information recording apparatus.

Figure 8:
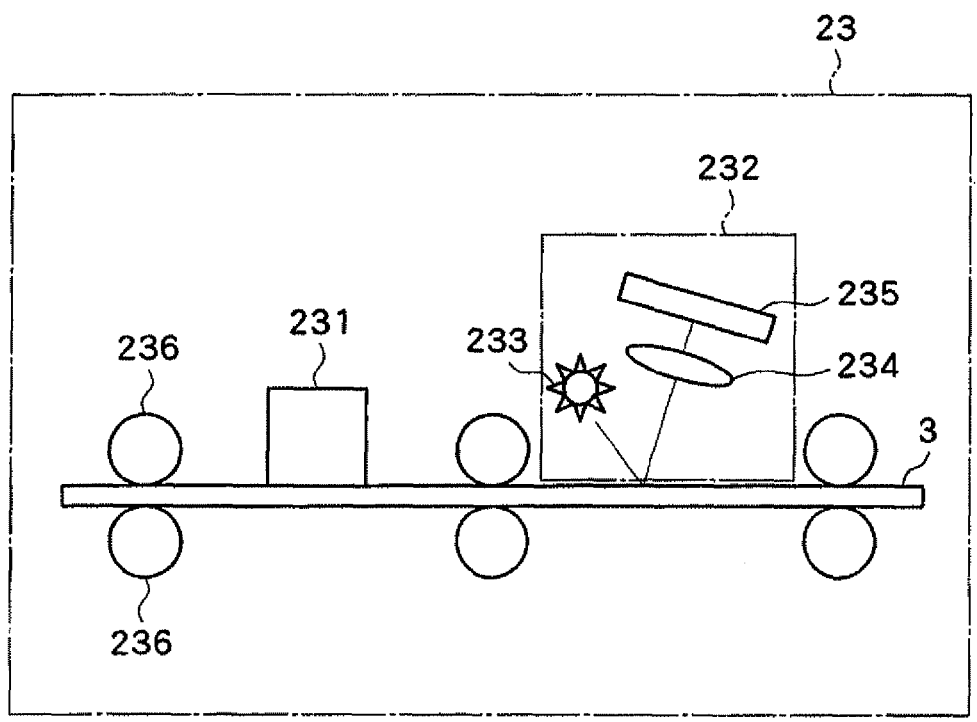
FIG. 8 is a view of a structure example of a magnetic card reader with an optical recording portion.

FIG. 8 is an example of a structure view of the magnetic card reader with an optical reading portion 23. The magnetic card reader with an optical reading portion 23 includes a magnetic reading portion 231, an optical reading portion 232 and two rollers 236.

The magnetic reading portion 231, under the control of the CPU 21, reads the intensities of magnetization of the respective reading positions on the recording area 31 of the recording medium 3 using a magnetic head.

The optical reading portion 232, similarly to the optical reading portion 132 of the magnetic card writer with an optical reading portion 13, has a structure in which a lens 234, an image pickup device 235 having a given level of resolution such as a CCD, and a light source 233 used to read an image are combined with each other. The optical reading portion 232 is used to read the lightness of the surface of the second area 42 shown in FIG. 3.

The recording medium 3 is charged from a card charge/discharge portion (not shown) into the inside of the magnetic card reader 23 by the rollers 236 and, after execution of the above-mentioned operation, is discharged to the card charge/discharge portion by the rollers 236.

Figure 9:
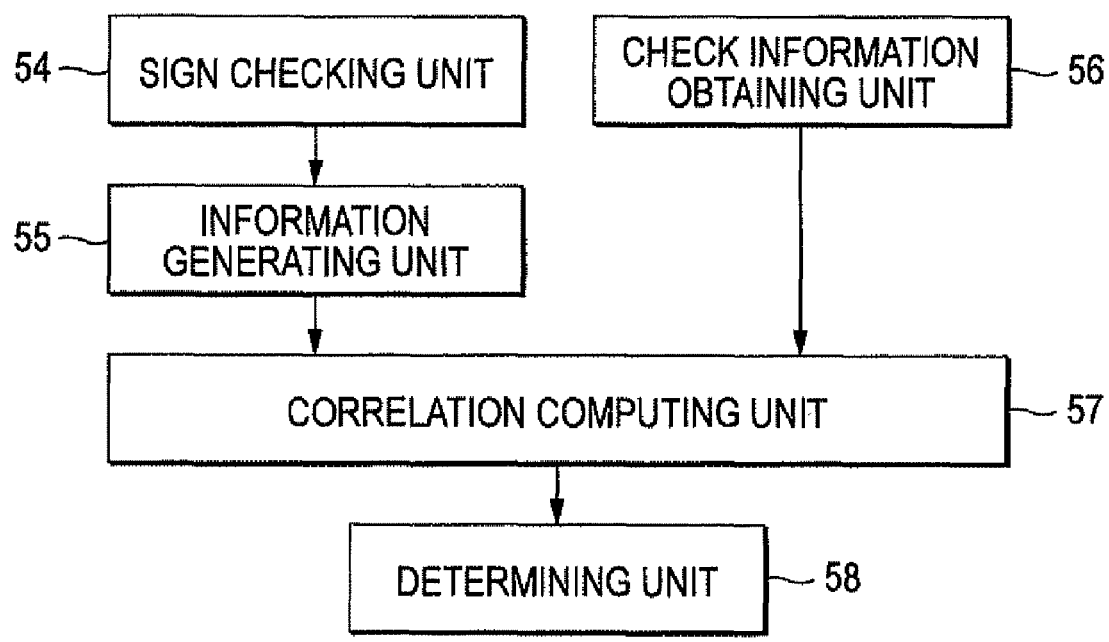
FIG. 9 is a function block diagram of the information reading apparatus according to the exemplary embodiment of the invention.

FIG. 9 is a functional block view of functions which can be realized by the information reading apparatus. The information reading apparatus functionally includes a sign checking unit 54, an information generating unit 55, a check information obtaining unit 56, a correlation computing unit 57, and a determining unit 58. These functions can be realized by the CPU 21 executing a program stored in the memory 22 to thereby control the magnetic card reader with an optical reading portion 23.

The sign checking unit 54 is structured mainly by the CPU 21 and magnetic card reader with an optical reading portion 23. The sign checking unit 54, while shifting the reading positions of the recording area 31, reads the intensities of magnetization of the respective reading positions and checks to which one of the signs thus-read intensity of magnetization corresponds.

The correspondence between the intensities of magnetization and signs is as shown by, for example, the graph of FIG. 1. Between the intensities of magnetization and signs in the information reading apparatus, there exists a correspondence relationship similar to the information recording apparatus; and, when the intensities of magnetization vary, the kinds of signs also vary. However, the intensity of magnetization in the reading operation does not agree with that in the recording operation completely. Thus, when the signs are arranged in order of the intensities of magnetization corresponding to the signs, the intensity of magnetization which can serve as the boundary for determining the Nth sign or N+$1^{st}$ sign is previously set. Here, N is one of natural numbers from 1 to (the state number−1). And, if the intensity of magnetization read at a certain reading position is not only equal to or more than the intensity of magnetization serving as the boundary for determining the N−1st sign or the Nth sign but also less than the intensity of magnetization serving as the boundary for determining the Nth sign or the N+$1^{st}$ sign, the sign checking unit 54 decides that it is the Nth sign. However, when the intensity of magnetization is less than the intensity of magnetization serving as the boundary for checking the $1^{st}$ sign or $2^{nd}$ sign, the sign checking unit 54 decides that it is the $1^{st}$ sign; and, when it is equal or more than the intensity of magnetization serving as the boundary for checking whether the sign is the (state number−1)th sign or the (state number)th sign, the sign checking unit 54 decides that it is the (state number)th sign.

The intensity of magnetization is read by the magnetic reading portion 231, while the movement of the reading positions on the recording area 31 can be realized by the rollers 236 moving the recording medium 3.

The information generating unit 55 is realized mainly by the CPU 21. The information generating unit 55 generates an arrangement composed of a series of signs respectively corresponding to the reading positions checked by the sign checking unit 54, and stores the arrangement into the memory 22 (this information is hereinafter referred to as reference data).

The check information obtaining unit 56 is realized mainly by the CPU 21 and optical reading portion 232. The check information obtaining unit 56 reads the pattern of the lightness of the surface of the second area 42 using the optical reading portion 232, and stores this information into the memory 22. This information is used as check information.

Here, the optical reading portion 232 reads a variation in the light reflectance caused by a character having a random property existing on the surface of the second area 42 serving as an area to be read with the same resolution and gradation as in the optical reading portion 132.

Figure 10:
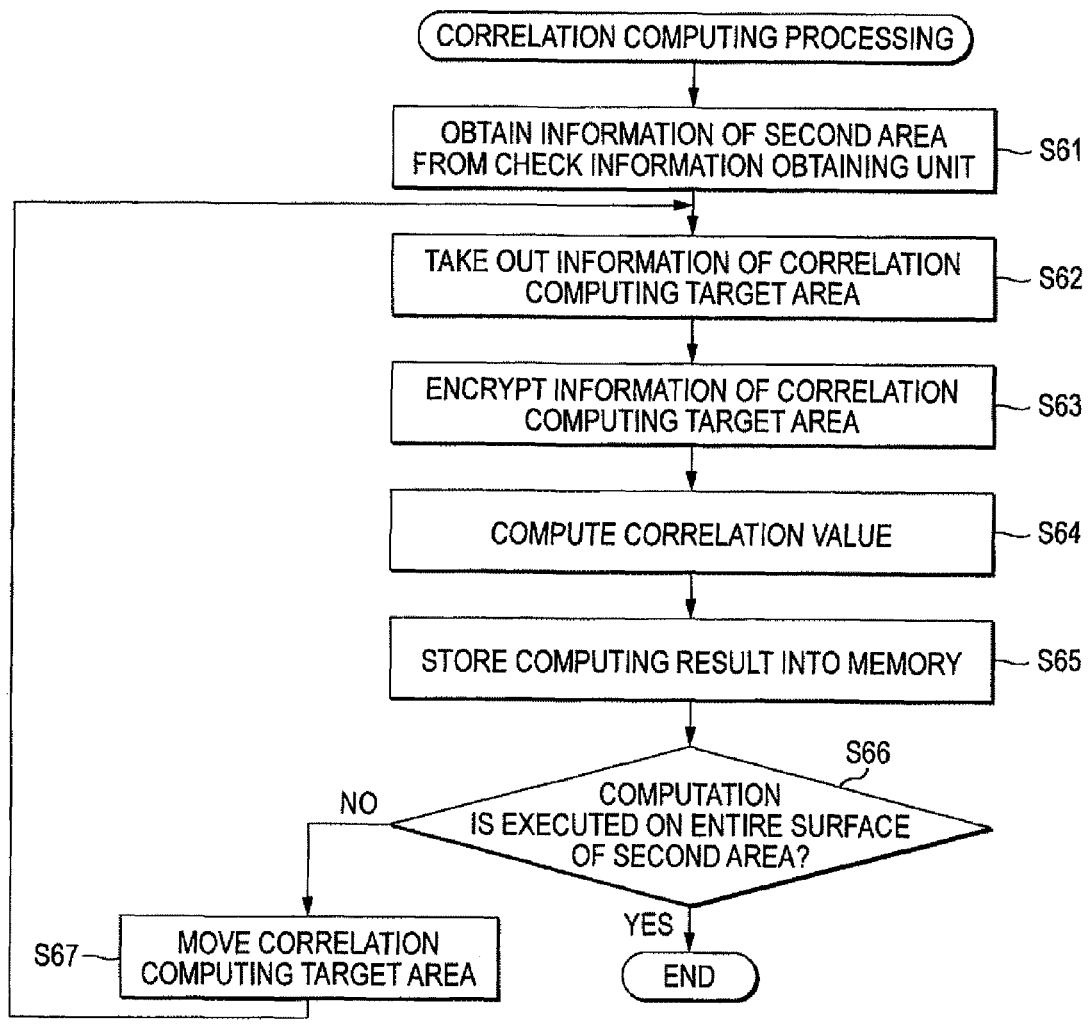
FIG. 10 is a view of an example of a flow of a correlation computing unit.

The correlation computing unit 57 is realized mainly by the CPU 21 and memory 22. The correlation computing unit 57 computes a correlation value between information based on a portion of check information obtained by the check information obtaining unit 56 and reference data generated by the information generating unit 55. As a specific example, there is shown in FIG. 10 a processing flow of the correlation computing unit 57 when the reference data is encrypted information.

The correlation computing unit 57 reads the check information obtained by the check information obtaining unit 56 from the memory 22 (Step S61), and cuts out such a portion of the thus-read check information as corresponding to the correlation computing target area 43 from the thus-read check information (Step S62). The correlation computing target area 43 is originally set at a given position within the second area 42.

The correlation computing unit 57 encrypts the information that has been cut out from the checking information and corresponds to the correlation computing target area 43 (Step S63), and computes a correlation value between an arrangement of the encrypted information and an arrangement of the reference data (Step S64). The correlation value expresses the degree of similarity between two arrangements of information. As an example of a method for computing the correlation value, there is known a normalizing correlation method. The computing result of the correlation value is stored into the memory 22 (Step S65).

The correlation computing unit 57 enforces the above-mentioned processings in Step S62 to Step S65 on all of the correlation computing areas 43 that can be set within the second area 42. As shown in FIG. 3, firstly, the correlation computing target area 43 is set on the left upward portion of the second area 42, the correlation computing target area 43 is shifted to the right by one dot each time the computation is carried out (from Step S62 to Step S65) and, when the correlation computing target area 43 exists on the right end of the second area 42, the correlation computing target area 43 is moved to the left end of the area 43 situated downward by one dot (Steps S66 and 67) As a result of this, into the memory 22, there is stored an arrangement composed of a plurality of correlation values respectively computed with respect to the correlation computing target area 43 at their respective positions.

By the way, owing to the occurrence of a wrong sign caused by an error which occurs during the time ranging from the recording of information by the sign arrangement recording unit 53 to the determination of the signs by the sign checking unit 54 according to the intensity of magnetization, for example, by a reading error made by the sign checking unit 54, there is a possibility that the information to be read (namely, the recording target information) and reference data cannot agree with each other. This error is liable to occur between the signs that correspond to the states near to the states (for example, the intensities of magnetization) recorded at the respective recording positions.

Here, in computing a correlation value between two arrangements, when signs expressed by the respective elements of the two arrangements correspond to the states that are near to each other, the correlation value may be set to provide a high value. In doing so, even when the above-mentioned reading error or the like exists in one of the two arrangements, the correlation value between the two arrangements will not decrease greatly when compared with a case where such error or the like does not exit. For example, when a correlation value computed between an arrangement of recording target information and another arrangement B is high, the correlation value between the reference data where the above-mentioned error occurs and the arrangement B is also computed as a high value.

Also, in a case where the above-mentioned error or the like occurs, when the reference data is decoded and is checked with the check information, there is a fear that it is impossible to check between the information obtained by decoding the reference data and a portion which is cut out from the check information and corresponds to the correlation computing target area 43. The reason for this is as follows. That is, a decoding operation is a converting operation to agitate information and, when there occurs the above-mentioned error between the data to be decoded and the data encrypted, there can be produced a great difference between the decoded data and the data before encrypted. Thus, the correlation computing unit 57 encrypts the information that (i) is cut out from the checking information and (ii) corresponds to the correlation computing target area 43, and computes a correlation value between the encrypted data and the reference data. According to this method, owing to a characteristic obtained when computing the above-mentioned correlation value, when compared with a case in which the reference data is decoded and two plaintexts are checked for their differences, it can be expected that there can be made a comparison which is strong with respect to the reading error of the recording area 31.

By the way, when the reference data is not encrypted, the correlation computing unit 57 does not carry out the step S63 which encrypts the information of the correlation computing target area 43 cut out from the check information. In this case, the correlation computing unit 57 computes a correlation value between (i) an arrangement of such information cut out from the check information in Step S62 and corresponding to the correlation computing target area 43 and (ii) an arrangement of the reference data (Step 564). A processing to be carried out in another step is a processing similar to a case in which the reference data is encrypted.

Figure 11:
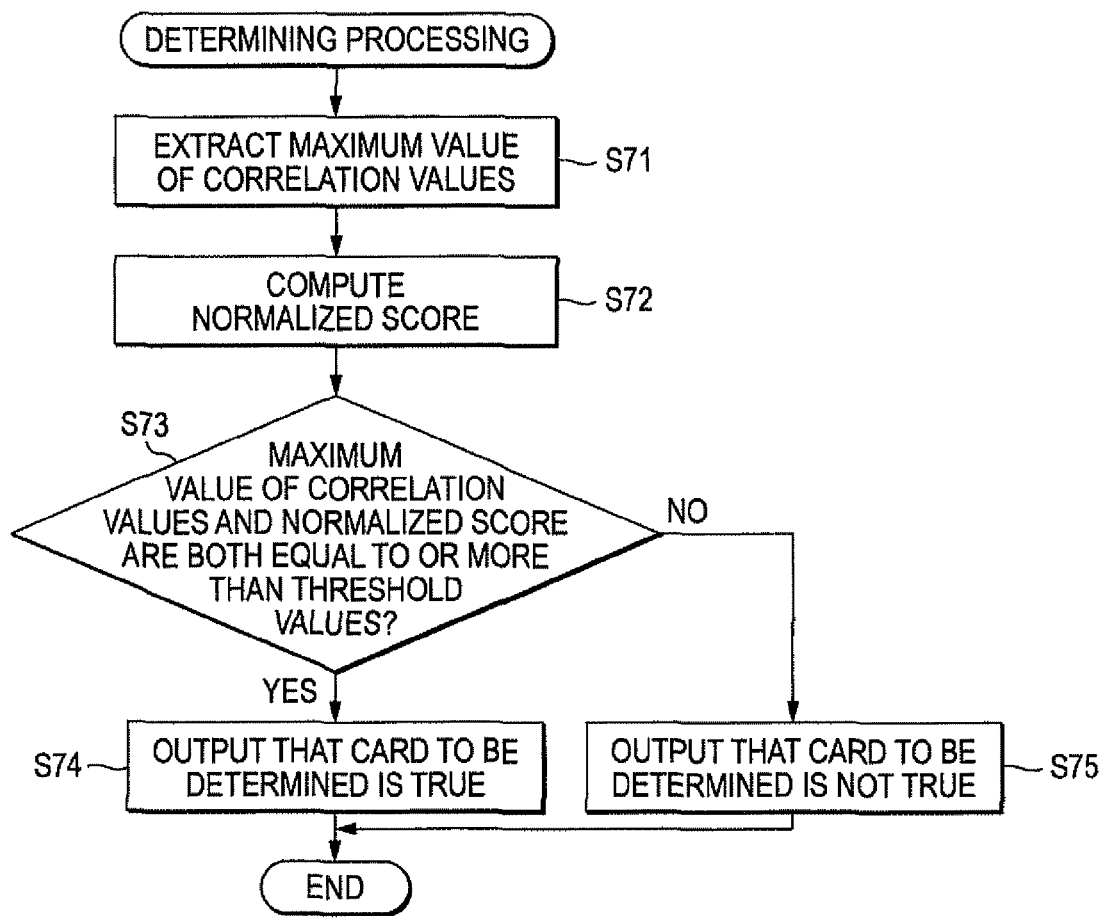
FIG. 11 is a view of an example of a flow of a processing to be carried out by a determining unit.

The determining unit 58 can be realized mainly by the CPU 21 and memory 22. The determining unit 58, while applying a statistical method to the set of correlation values computed in the correlation computing unit 57, checks whether the checking information and reference data correspond to each other. Specifically, the determining unit 58 carries out a processing according to a processing flow shown in FIG. 11.

The determining unit 58 extracts the maximum value from the set of the correlation values computed in the correlation computing unit 57 (Step S71). There seems a high possibility that the correlation computing target area 43 used as a target from which the thus-extracted maximum value is computed corresponds to the first area 41 read from the surface of the recording medium 3 by the information recording apparatus. And, using the following equation, a value, which is obtained when the average value of the correlation values is deducted from the extracted maximum value, is divided by the standard deviation of the correlation values, to thereby compute the normalized score of the maximum value of the correlation values (Step S72).

Normalized score=(Maximum Value of Correlation Values−Average Value of Correlation Values)+ Standard Deviation of Correlation values The determining unit 58 checks from the maximum value of the correlations obtained in Step S71 and the normalized score of the maximum value of the correlation values obtained in Step S72 whether the recording medium to be determined is true or not (Step S73). Specifically, for example, when the maximum value of the correlation values is equal to or more than a first given value (for example, 0.3) and the normalized score of the maximum value of the correlation values is a second given value (for example, 5.0), the recording medium is determined true, and, otherwise, it is determined not true.

Whether the determination result is true or not is output to the outside by the determining unit 58 (Step S74 or S75).

Here, there are two references which are used to determine that the maximum value of the correlation values computed by the correlation computing unit 57 is true. One reference is that the maximum value of the correlations itself is equal to or more than a given value, and the other is that the maximum value of the correlation values is a value which cannot be accidentally produced when computing the correlation values as to a recording medium 3 which is not recorded by the information recording apparatus. Here, as a criterion for the latter determination, there is used the normalized score.

[Modifications]

In the foregoing description, when recording information into a recording medium, a recording area is divided in one dimension in the moving direction of the magnetic card; and, the intensities of magnetization corresponding to signs in the respective areas (the respective recording positions) of the recording area are recorded and are also read. However, the recording area may also be divided in two dimensions; and, the intensities of magnetization corresponding to signs in the respective areas (the respective recording positions) of the recording area may be recorded and read.

Also, according to the present exemplary embodiment, description has been given of an example in which information is recorded into the magnetic recording area of a magnetic card. However, the recording area is not limited to the magnetic recording area.

For example, instead of the magnetic recording area, in a recording medium, there may be provided an area which is capable of forming grooves differing in depth from each other; and, instead of the intensities of magnetization of the respective recording positions, a plurality of kinds of states may also be expressed by the depths of the grooves of the respective recording positions. In this case, instead of the magnetic recording portion 131, there may be used a groove working device and, instead of the magnetic reading portion 231, there may be used a groove depth reading sensor.

Further, as the recording area, there may also be provided an area capable of forming an image therein; and, a plurality of states may also be expressed by differences between appearances formed at the respective recording positions on the recording area by an image forming apparatus.

As the area capable of forming an image therein, for example, there can be used paper which is capable of printing. To form the appearances, for example, there may be used an image printing apparatus; that is, for example, ink or a toner may be used to form appearances of kinds respectively corresponding to signs at the recording positions of the printable area of the image printing apparatus. The above-mentioned appearances are the shades of gradations and colors that are formed according the sizes of dots, an increase or a decrease in the quantity of ink, use of a plurality of coloring materials and the like. Here, the appearances are not limited to the appearances that can be made to occur due to a visible light, but they may also be images which can be formed owing to the radiation of other lights than the visible light.

The above-formed appearances can be read using an apparatus including an image pickup device having a given resolution. As the specific examples of the apparatus, there can be used an image scanner and a digital camera.

Also, the recording medium is not limited to a card-shaped medium, but there may also be used a thin sheet-shaped medium, provided that it includes a necessary recording area.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information recording apparatus comprising:
    an information obtaining unit that obtains information to be recorded on a recording medium;
    a sign arrangement generating unit, based on information to be obtained by the information obtaining unit, that generates an arrangement having three or more kinds of signs for expressing the obtained information; and
    a sign arrangement recording unit, while shifting recording positions of a recording area included in the recording medium, that records physical features sequentially into the respective recording positions of the recording area included in the recording medium,
    wherein each physical feature corresponds to one kind of the signs.

2. The information recording apparatus according to claim 1,
    wherein the recording area is a magnetic recording area,
    the sign arrangement recording unit magnetizes the respective recording positions of the recording area, and
    each magnetization intensity of the recording position corresponds to one kind of the signs.

3. The information recording apparatus according to claim 1,
    wherein the recording area is a recording area on which grooves are formed in different depths,
    the sign arrangement recording unit forms the grooves at the respective recording positions of the recording area, and
    each depth of the groove corresponds to one kind of the signs.

4. The information recording apparatus according to claim 1,
    wherein the recording area is a recording area on which images are formed,
    the sign arrangement recording unit forms the images at the respective recording positions of the recording area, and
    an appearance of each image corresponds to one kind of the signs.

5. The information recording apparatus according to claim 1,
    wherein the information obtaining unit obtains the information to be recorded according to a characteristic having a random property existing on a surface of the recording medium.

6. The information recording apparatus according to claim 5,
    wherein the information obtaining unit reads optically the characteristic existing on the surface of the recording medium and obtains the information to be recorded.

7. The information recording apparatus according to claim 5,
    wherein the sign arrangement generating unit encrypts the information to be recorded and,
    the sign arrangement generating unit, based on the encrypted information, generates the arrangement.

8. An information reading apparatus, comprising:
    a sign checking unit, while shifting respective reading positions of a recording area included in a recording medium, that checks states sequentially from the respective reading positions of the recording area included in the recording medium,
    wherein each state corresponds to one kind of three or more kinds of signs; and
    an information generating unit, based on the checking result by the sign checking unit, that generates information recorded in the recording area.

9. The information reading apparatus according to claim 8,
    wherein the recording area is a magnetic recording area, and
    the sign checking unit determines, to each reading position, one kind of the signs based on intensity of magnetization recorded at each reading position of the recording area.

10. The information reading apparatus according to claim 8,
    wherein the recording area is a recording area on which grooves are formed in different depths, and
    the sign checking unit selects, to each reading position, one kind of the signs based on the depth of the groove formed at each reading position of the recording area.

11. The information reading apparatus according to claim 8,
    wherein the recording area is a recording area on which images are formed, and
    the sign checking unit determines, to each reading position, one kind of the signs based on an appearance of the image formed at each respective reading position of the recording area.

12. The information reading apparatus according to claim 8, further comprising:
    a correlation computing unit that computes a correlation between information based on at least a part of check information and information generated by the information generating unit; and
    a determining unit, based on the correlation computed by the correlation computing unit, that checks whether the check information corresponds to the information generated by the information generating unit or not.

13. The information reading apparatus according to claim 12,
    wherein the recording area stores information based on a characteristic having a random property existing in a first area of the surface of the recording medium,
    the information reading apparatus further comprises a check information obtaining unit that obtain the check information by reading the characteristic of a second area which includes the first area of the surface of the recording medium and is wider than the first area, and
    the correlation computing unit, while moving a correlation computing target area having a size corresponding to the first area within the second area of the surface of the recording medium, computes information based on the part of check information corresponding to the correlation computing target area and information generated by the information generating unit respectively, and
    the determining unit, based on a plurality of correlations to be computed by the correlation computing unit, checks whether the check information corresponds to the information generated by the information generating unit or not.

14. The information reading apparatus according to claim 13,
wherein the check information obtaining unit obtain the check information by reading optically the characteristic of the second area of the surface of the recording medium.

15. The information reading apparatus according to claim 13,
wherein the information to be recorded in the recording area is encrypted, and
the correlation computing unit computes the correlation between information provided by encrypting the part of check information corresponding to the correlation computing target area and information to be generated by the information generating unit.

16. A computer readable medium storing a program causing a computer to execute a process for recording physical features into a recording medium, the process comprising:
obtaining information to be recorded on the recording medium;
generating, based on information to be obtained by the information obtaining unit, an arrangement having three or more kinds of signs for expressing the obtained information; and
recording while shifting recording positions of a recording area included in the recording medium, the physical features sequentially into the respective recording positions of the recording area included in the recording medium,
wherein each physical feature corresponds to one kind of the signs.

17. A computer readable medium storing a program causing a computer to execute a process for reading physical features from a recording medium, the process comprising:
checking while shifting respective reading positions of a recording area included in a recording medium, the physical features sequentially from the respective recording positions of the recording area included in the recording medium,
wherein each physical feature corresponds to one kind of three or more kinds of signs; and
generating, based on the checking result, information recorded in the recording area.

* * * * *